United States Patent [19]

Moreiras et al.

[11] Patent Number: 5,413,147

[45] Date of Patent: May 9, 1995

[54] FLEXIBLE HOSE AND FITTING ASSEMBLY

[75] Inventors: Luis Moreiras, Willoughby, Ohio; Frederick J. Davis, Red Oak, Iowa; Issac Shilad, Mentor, Ohio

[73] Assignee: Parker-Hannifin Corporation, Cleveland, Ohio

[21] Appl. No.: 55,007

[22] Filed: Apr. 29, 1993

[51] Int. Cl.⁶ .................................. F16L 47/00
[52] U.S. Cl. .................... 138/109; 138/121; 138/122; 138/125; 138/126; 285/258; 285/259
[58] Field of Search .............. 138/109, 121, 122, 125, 138/126, 127, 173; 285/903, 259, 258

[56] References Cited

U.S. PATENT DOCUMENTS

| | | | |
|---|---|---|---|
| 1,630,895 | 5/1927 | Herbst | 138/121 |
| 2,019,540 | 11/1935 | Mascuch | 285/256 |
| 2,309,719 | 2/1943 | Vaill | 285/256 |
| 2,449,369 | 9/1948 | Doane et al. | 138/121 |
| 2,757,690 | 8/1956 | Young | 138/121 |
| 2,785,382 | 3/1957 | Lamb | 138/121 |
| 3,381,981 | 5/1968 | Wilson | 285/259 |
| 3,420,553 | 1/1969 | Poxon et al. | 138/121 |
| 3,568,736 | 3/1971 | Linch et al. | 137/614.04 |
| 3,580,289 | 5/1971 | James et al. | 138/121 |
| 3,599,677 | 8/1971 | O'Brien | 138/122 |
| 3,712,336 | 1/1973 | Bell, Jr. | 137/613 |
| 3,791,680 | 2/1974 | Cleare | 285/259 |
| 3,794,080 | 2/1974 | Huston et al. | 138/121 |
| 3,837,364 | 9/1974 | Jenner | 138/122 |
| 4,063,757 | 12/1977 | Führmann | 285/903 |
| 4,106,523 | 8/1978 | Thornton et al. | 137/614.04 |
| 4,182,019 | 1/1980 | Tally et al. | 29/453 |
| 4,182,370 | 1/1980 | Karcher | 137/614.04 |
| 4,369,992 | 1/1983 | Fournier et al. | 285/903 |
| 4,400,022 | 8/1983 | Wright | 285/259 |
| 4,513,787 | 4/1985 | Hegler et al. | 138/166 |
| 4,729,583 | 3/1988 | Lalikos et al. | 285/256 |
| 4,758,029 | 7/1988 | Davis | 285/253 |
| 4,804,212 | 2/1989 | Vyse . | |
| 4,805,942 | 2/1989 | Goodridge | 285/149 |
| 4,905,736 | 3/1990 | Kitami et al. | 138/137 |
| 4,998,564 | 3/1991 | Igarashi et al. | 138/126 |
| 5,037,143 | 8/1991 | Sanders et al. | 285/258 |
| 5,042,844 | 8/1991 | Iida et al. | 285/903 |
| 5,080,132 | 1/1992 | Manz et al. | 137/614.04 |
| 5,084,314 | 1/1992 | Igarashi et al. | 138/137 |
| 5,089,074 | 2/1992 | Winter et al. | 138/121 |
| 5,105,854 | 4/1992 | Cole et al. | 138/109 |
| 5,129,428 | 7/1992 | Winter et al. | 138/121 |
| 5,129,686 | 7/1992 | Sanders et al. | 285/258 |
| 5,148,836 | 9/1992 | Lawrence | 138/121 |
| 5,209,267 | 5/1993 | Morin | 138/109 |
| 5,275,208 | 1/1994 | Lawrence | 138/121 |
| 5,279,333 | 1/1994 | Lawrence | 138/122 |
| 5,653,542 | 3/1987 | Tascher | 138/109 |

FOREIGN PATENT DOCUMENTS

| | | | |
|---|---|---|---|
| 692353 | 8/1964 | Canada | 138/122 |
| 0010751 | 11/1978 | European Pat. Off. | 138/122 |
| 2519492 | 12/1975 | Germany | 138/121 |
| 769993 | 3/1957 | United Kingdom | 138/122 |
| 1506776 | 4/1978 | United Kingdom | 138/122 |

OTHER PUBLICATIONS

Uniweld Products, Inc., Brochure Entitled: "Uniweld Black Magic Green Magic" 1992.

*Primary Examiner*—James E. Bryant, III
*Attorney, Agent, or Firm*—Renner, Otto, Boisselle & Sklar

[57] ABSTRACT

A fluid conveying hose, especially a refrigerant conveying hose, that exhibits improved resistance to permeation of the refrigerant while still affording desirable flexibility, and a fitting for such hose and methods of making the hose and the union between the hose and fitting. Also provided is a coupling assembly for a hose and a service fitting that is a considerably less expensive alternative to existing assemblies equipped with relatively expensive shut-off valves or quick connect/disconnect couplers.

16 Claims, 2 Drawing Sheets

FLEXIBLE HOSE AND FITTING ASSEMBLY

The present invention relates generally to a flexible hose and fitting therefor that are particularly useful in conveying refrigerants or the like, and to an inexpensive valved coupling assembly useful with the hose and fitting for minimizing loss of refrigerant or the like during coupling and decoupling of the hose from another device. Because the invention was conceived and developed for use in connection with refrigerant charging/recovery equipment, and is particularly useful for such, it will be described herein chiefly in this context. However, the invention in its broader aspects could be adapted to other refrigerant systems and, more generally, to other fluid handling processes, as will be appreciated by those skilled in the art upon a reading and understanding of this specification.

BACKGROUND

Refrigerant charging/recovery equipment heretofore have used a flexible hose to provide for connection to a refrigeration system being serviced, such as an automobile air conditioning system, to enable the refrigerant to be charged into or sucked out of the system. The flexible hose has been provided with a fitting at its free end for coupling to a service fitting provided in the refrigeration system. The service fitting usually is equipped with a check valve to prevent the escape of refrigerant from the refrigeration system when the flexible hose is not coupled thereto. A commonly employed check valve has been the inexpensive Schrader-type valve.

Because the service fitting often is in a difficult to reach position and/or at an awkward orientation, the refrigerant conveying hose of the charging/recovery equipment should be easy to flex to facilitate alignment of the fitting at the end of the hose with the service fitting of the refrigeration system. For this reason, prior art refrigerant conveying hoses have been made largely from rubber materials, a typical hose having a three-layered structure consisting of an inner rubber layer or core, an intermediate layer of braided synthetic fiber reinforcement, and an outer or cover layer of rubber.

These prior art rubber hoses were quite acceptable when there was less concern about the escape of refrigerants to the atmosphere. In the past, the refrigerant left in the refrigerant conveying hose after disconnection from the service fitting was allowed to escape to the atmosphere. However, today this is undesirable and any loss of refrigerants, such as Freon, to the atmosphere is considered by many to be undesirable. For this reason, it is known to put a manually operated shut-off valve at the end of the refrigerant conveying hose to prevent the escape of refrigerant from the hose when disconnected from the service fitting.

When the refrigerant is trapped in the conveying hose, a problem arises from the use of the above mentioned prior art rubber hoses. These hoses suffer from the problem of progressive escape of the refrigerant contained therein because of rubber's comparatively high gas permeability. Hence, refrigerant trapped in the refrigerant conveying line, which may be of considerable length, will permeate out through the walls of the hose and escape to the atmosphere.

In order to overcome this problem, there has been provided a hose including a non-permeating nylon core tube, an intermediate braided synthetic fiber reinforcement layer and an outer thermoplastic or rubber cover layer. Although exhibiting improved resistance to refrigerant permeation, this is at the expense of comparatively higher rigidity, i.e., reduced flexibility.

Also known and described in U.S. Pat. No. 5,089,074 is a flexible hose construction comprising an inner corrugated hose made of polymeric material, an outer sleeve of reinforcing material disposed in telescoping relation on the inner hose, an outer cover layer, and a tube of polymeric material disposed between the sleeve of reinforcing material and the inner hose and extending in a generally straight-line manner from apex to apex of the hose corrugations so as to tend to prevent the sleeve of reinforcing material from entering into the recesses of the inner hose by an amount that would substantially reduce the flexibility characteristics of the inner hose. The inner corrugated hose, intermediate tube and outer cover layer are all said to be made of a suitable polymeric material and, more specifically, to be made of a thermoplastic material. Consequently, such hose construction is perceived as still having considerable stiffness when compared to rubber hoses previously used in refrigerant charging/recovering equipment.

Accordingly, a need exists, especially for use in refrigerant charging/recovery equipment, for a refrigerant conveying hose having low permeability associated with hoses that use an inner nylon core and high flexibility associated with rubber hoses.

SUMMARY OF THE INVENTION

The present invention provides a fluid conveying hose, especially a refrigerant conveying hose, that exhibits improved resistance to permeation of the refrigerant while still affording desirable flexibility. In connection therewith, the invention provides a fitting for such hose and methods of making the hose and the union between the hose and fitting.

In accordance with the invention, a flexible hose comprises an inner corrugated tube of polymeric material impervious to the fluid to be conveyed through the hose, an intermediate layer of rubber material surrounding the inner corrugated tube, a braided layer of fiber reinforcement material, and an outer layer of rubber material surrounding the braided layer of fiber reinforcement. The corrugated tube has alternating radially outer ridges and radially outwardly opening grooves axially staggered in relation to alternating radially inner ridges and radially inwardly opening grooves, and the intermediate layer of rubber penetrates partway into the radially outwardly opening grooves with a void being left at the bottom of the radially outwardly opening grooves. The radially outer ridges of the inner corrugated tube preferably are flat for controlling the degree of penetration of the intermediate rubber layer into the radially outwardly opening grooves.

In a preferred embodiment, the intermediate and outer layers of rubber material are integrally joined together through interstices in the braided layer of fiber reinforcement by simultaneous curing thereof, and the braided layer is formed by synthetic fibers braided around the intermediate layer of rubber material. Preferably, the inner corrugated tube is made of a nylon material and the corrugations extend circumferentially of the tube.

The invention also provides a fitting for the flexible hose. The fitting includes a nipple having an insert portion disposed in the hose and a tubular metal sleeve crimped around the hose coextensively with the insert portion of the nipple. The nipple includes a plurality of circumferentially extending protrusions on the outer surface thereof that are axially spaced apart at the same pitch as the radially inwardly opening grooves of the hose. The protrusions have an outer diameter greater than the inner diameter of the corrugated tube at the inner ridges thereof, and the protrusions are aligned with and extend into corresponding radially inwardly opening grooves of the hose. Preferably, the forwardmost one of the protrusions has at its forward end a frusto-conical ramp surface sloped at an angle of less than 30° to the axis of the insert portion to facilitate insertion of the insert portion into the hose without damaging the inner corrugations as they pass over the forwardmost protrusion. The protrusions define therebetween flat bottom grooves that are shallower than the radially inwardly opening grooves of the inner corrugated tube of the hose when undeformed, and the radially inner ridges of the inner corrugated tube of the hose, when undeformed, have a width equal the width of the flat bottoms of the grooves between the protrusions.

The invention also provides a method of making the aforesaid hose and for assembling the hose to the aforesaid fitting.

The foregoing and other features of the invention are hereinafter fully described and particularly pointed out in the claims, the following description and the annexed drawings setting forth in detail certain illustrative embodiments of the invention, these being indicative, however, of but a few of the various ways in which the principles of the invention may be employed.

DETAILED DESCRIPTION

While the various features of the invention are hereinafter illustrated and described as being particularly adapted to provide a flexible hose for conveying refrigerant or the like therethrough, it is to be understood that the various features of the invention can be utilized singly or in various combinations thereof to provide a flexible hose for conveying other types of fluids therethrough for other types of apparatus than that specified herein, as may the fitting and coupling assembly, and components thereof.

Figure 1:
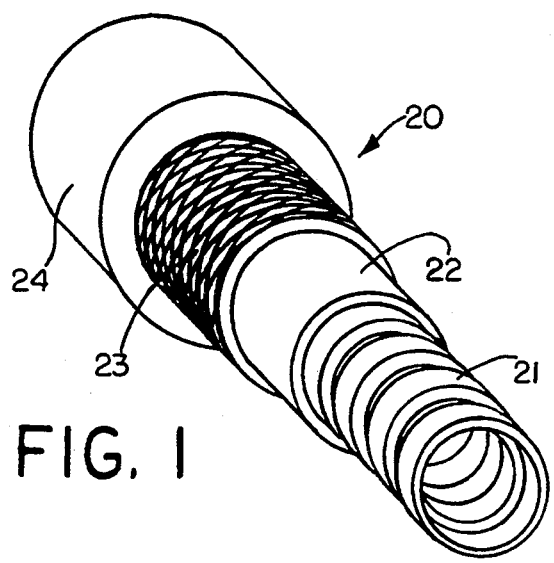
FIG. 1 is fragmentary perspective view of a preferred embodiment of hose according to the invention, with layers thereof progressively removed for illustration purposes.
Figure 2:
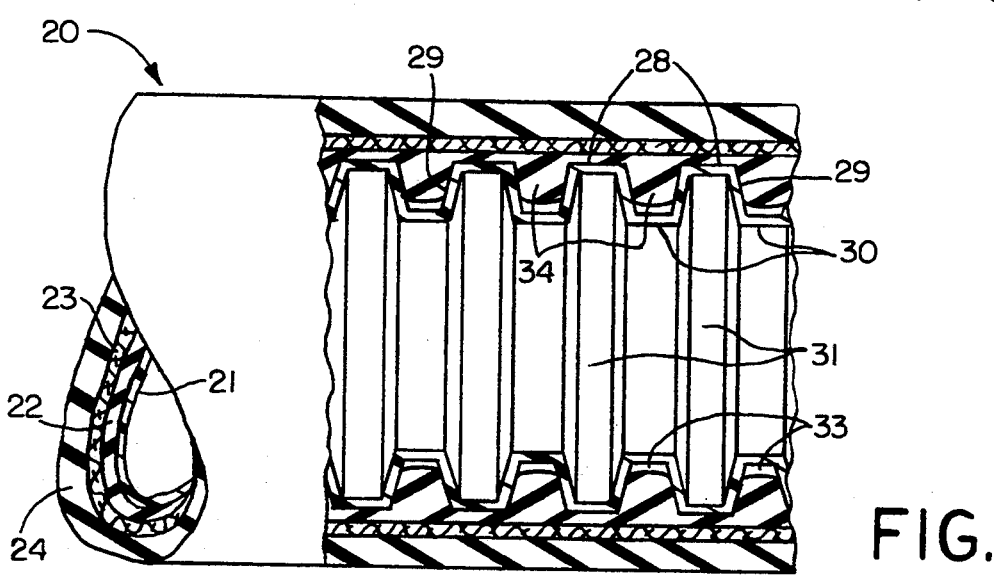
FIG. 2 is a fragmentary side elevational view, partly in section, of the hose of FIG. 1.

Referring now to FIGS. 1 and 2, a flexible hose according to the invention is generally indicated by reference numeral 20. The hose 20 comprises an inner corrugated tube 21 forming an inner layer, an intermediate layer 22, a reinforcement layer 23 and an outer cover layer 24. The details of these component layers are discussed below along with their method of assembly generally in the order of assembly.

The inner corrugated tube 21 may be made of a variety of polymeric materials, the choice of which depends on the use to which the hose will be put. Typical materials include various nylons, polyvinyl chlorides, polyethylene, polypropylene or fluoroplastics. The primary criteria for selecting the material of the core tube is high resistance to permeation of the fluid of interest. For use with refrigerants, polycaprolactam (Nylon 6) and other nylons are preferred. In addition to having comparatively high permeability to refrigerants such as Freon, nylons are strong, tough and have high impact strength along with high resistance to abrasion with excellent chemical resistance including resistance to various hydrocarbons.

The corrugated core tube 21 may be blow molded in a conventional manner into the seamless configuration illustrated in FIG. 2 wherein the corrugations are annular and uniformly spaced along the length of the core tube. Alternatively, but less desirably, the core tube may be formed with helical convolutions as opposed to the circumferentially extending corrugations shown in FIG. 2.

The corrugations include alternating radially outer ridges 28 and radially outwardly opening grooves 29 that are axially staggered in relation to alternating radially inner ridges 30 and radially inwardly opening grooves 31. In accordance with the invention, the radially outer ridges (crests) are flat as opposed to rounded, for a reason hereinafter discussed. However, the bottoms (valleys) of the radially outwardly opening grooves, i.e., the radially inner ridges, also may be flat or, alternatively, rounded.

Figure 3:
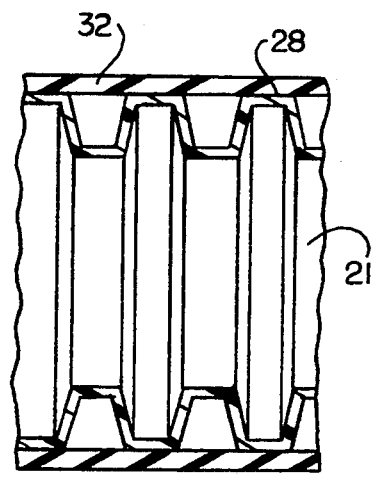
FIG. 3 is a fragmentary sectional view through the hose at an intermediate stage of its construction.

The intermediate layer 22 surrounds the inner corrugated tube and preferably is made of an elastomeric material and, in particular, rubber. During formation of the hose 20 according to a preferred embodiment of the invention, the intermediate layer, in the form of a strip 32 of uncured rubber, is wrapped around the inner corrugated tube 21 to form a substantially cylindrical layer that it is supported atop the flat radially outer ridges 28 as shown in FIG. 3. The strip 32 of uncured rubber may be wrapped, for example, helically around the inner corrugated tube although more preferably the strip is folded around the inner corrugated tube with the longitudinal edges thereof being brought together to form a seam parallel to the longitudinal axis of the tube 21.

After the strip 32 of uncured rubber has been applied around the inner corrugated tube 21, the reinforcement layer 23 is applied. The reinforcement layer preferably is a braided synthetic fiber material such as, for example, polyester fiber preferably treated with a poly-vinyl acid. The reinforcement strands may be applied in a conventional hose forming manner such that the braiding operation causes the intermediate rubber layer 22 to somewhat extrude axially from the flat ridges and flow partway into the radially outwardly opening grooves 29 disposed between the radially outer ridges 28 as seen in FIG. 2. The intermediate layer 22, in accordance with the invention, does not completely fill the radially outwardly opening grooves 29. Instead, the intermediate layer only partially fills the radially outwardly opening grooves as is desired to provide, on the one hand, a void 33 at the bottom of each radially outwardly opening groove 29 to promote flexibility. On the other hand, the intermediate layer 22 is thus formed with annular, radially inwardly protruding ribs 34 that interdigitate with the corrugations of the inner corrugated tube 21 to provide an axial interference and hence a mechanical interlock between the intermediate rubber layer 22 and the inner corrugated tube 21. The mechanical interlock restricts relative axial movement between the inner corrugated tube and the intermediate layer, inasmuch as normally there will be no reliance on the formation of a chemical bond between these two layers as had been practiced in prior art hose constructions wherein an intermediate layer and inner tube were both made of polymeric materials that would adhere to one another. In the illustrated hose construction, the inner tube preferably is made of a polymeric material such as nylon whereas the intermediate layer is made of a rubber material. No chemical bond is formed between these two layers and there is comparatively low adhesion between the two layers.

As above indicated, the radially outer ridges 28 are flat as opposed to rounded. This is important in preventing the strip 28 (FIG. 3) that forms the uncured intermediate rubber layer 22 (FIG. 2) from being forced all the way into the radially outwardly opening grooves 29 between the flat radially outer ridges by application of the reinforcement. The flat radially outer ridges 28 provide greater support than would be obtained from rounded ridges and thereby provide greater control over the extent of penetration of the comparatively flimsy strip 32 of uncured rubber into the radially outwardly opening grooves of the inner corrugated tube.

After the fiber reinforcement 23 has been applied, the outer or cover layer 24 is applied over the reinforcement layer such as by being extruded as a continuous tube by conventional extruding apparatus. The cover layer preferably is made of the same rubber material as the intermediate rubber layer, such as chlorinated polyethylene, which is applied in its uncured state to the reinforcement layer by extrusion. Then, the thus assembled hose is subjected to appropriate temperature and pressure conditions simultaneously to cure the intermediate and cover layers.

As will be appreciated, the extrusion process forces the rubber material of the cover layer 24 into intimate contact with the intermediate layer 22 at the interstices in the braided reinforcement 23. That is, the cover layer will be forced into the interstices in the braided reinforcement for contact with the intermediate layer and/or into contact with portions of the intermediate layer that may extend into and/or through the reinforcement as a result of the braiding process. The result is the creation of an integral bond between the intermediate and cover layers upon subsequent curing of the two rubber layers. In addition, the reinforcement will be embedded in and thereby mechanically locked between the resultant integrally joined, chemically bonded, intermediate and cover layers.

The above described hose has high resistance to permeation of refrigerant, high flexibility, high kink resistance, and high burst strength that may be rated as high as 3000 psi.

Figure 4:
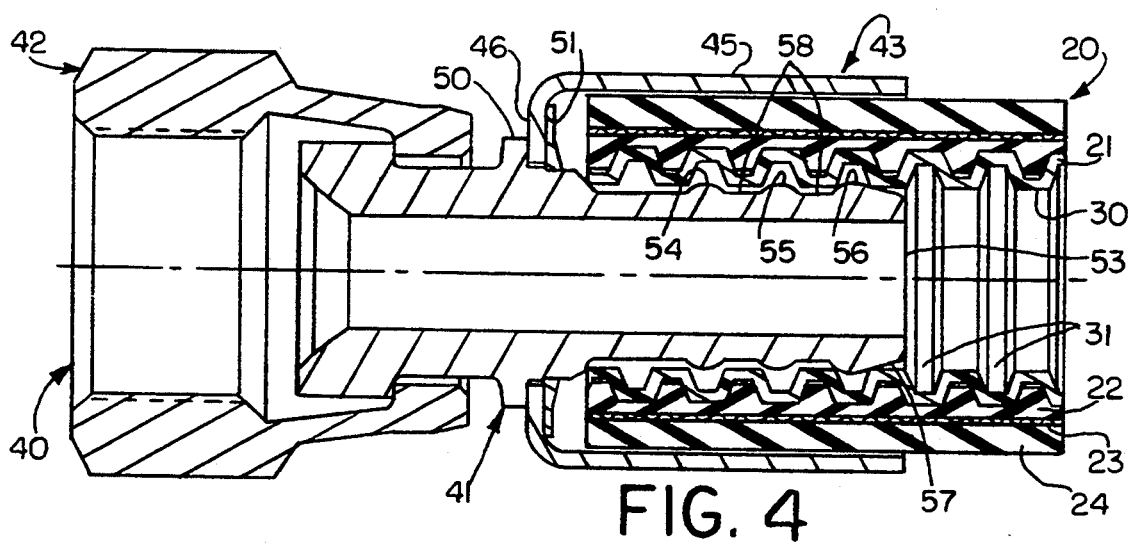
FIG. 4 is a fragmentary sectional view showing assembly of the hose with a fitting prior to the fitting being crimped onto the hose.

Referring now to FIG. 4, a preferred fitting is shown for use in terminating the hose 20 for connection to other devices. The fitting 40 includes a nipple 41, a swivel nut 42 and a crimp sleeve 43. In FIG. 4, the crimp sleeve 43 is shown before crimping.

As is desired, provision is made for retaining the sleeve 43 on the nipple 41 prior to assembly of the fitting on a hose, thereby to prevent separation of the sleeve from the nipple during, for example, storage of the fittings prior to use. In the illustrated embodiment, the sleeve 43 has a cylindrical wall 45 which terminates at one end at a radially inwardly turned end wall 46. The end wall 46 has a central opening whereby it may be telescoped onto the nipple 41 and trapped between an annular flange 50 on the fitting and a retainer 51 press fit on the fitting, as illustrated. The cylindrical wall 45 of the sleeve 43 has an inner diameter slightly greater than the outer diameter of the hose 20 for insertion of the hose into an annular space formed between the cylindrical sleeve wall 45 and an insert portion 53 of the nipple.

As seen in FIG. 4, the insert portion 53 of the nipple 41 is intended to be inserted into the interior of the hose 20. The outer surface of the insert portion 53 has a plurality of annular protrusions which are axially spaced apart at the same pitch as the radially inwardly opening grooves 57 of the inner corrugated tube 21 of the hose. As shown, there are three such protrusions 54–56. In the illustrated preferred embodiment, the protrusions 54 and 55 are in the form of annular beads having a symmetrical convex surface. The forwardmost or first protrusion 56, however, is similarly shaped at its rearward side, but its forward side is sloped to provide a gradually inclined ramp surface 57. This ramp surface preferably is frusto-conical with an apex angle in the range of 5°–30° and more preferably in the range of 10°–20°. Also, the first protrusion 56 has a diameter slightly greater than the diameter of the other annular protrusions 54 and 55.

As further seen in FIG. 4, the second and third annular protrusions 54 and 55 have a width (in the axial direction) that is approximately equal the width of the radially inwardly opening grooves 31 at the inner diameter of the inner corrugated tube 21. Correspondingly, the flat bottoms 58 of the shallow grooves formed between the annular protrusions have a width corresponding to the width of the radially inner ridges 30 at the inner diameter of the corrugated tube 21.

The ramp 57 at the front end of the first annular protrusion 56 facilitates insertion of the insert portion 53 into the interior of the hose 20 and further protects against damage to the radially inner ridges 30 as they are urged over the annular protrusion 56. When the insert portion of the nipple 41 has been fully inserted into the interior of the hose as illustrated in FIG. 4, the radially inner ridge 30 immediately rearwardly adjacent the annular protrusion 56 will have only passed over the annular protrusion 56 which is provided with the lead-in ramp surface 57 to protect against distortion of the inner corrugation. This immediately adjacent radially inner ridge will also be aligned with the flat bottom 58 of the shallow groove located between the first and second annular protrusions 56 and 55. It is important that the radially inner ridge that last passes over the first annular protrusion 56 be controllably expanded gradually and progressively by the ramp surface for uniform expansion and preservation of its annularity without irregular deformation whereupon after it passes over the first annular protrusion it may uniformly collapse into the shallow recess between the first and second annular protrusions essentially in its original undeformed condition. As for any of the preceding radially inner ridges which passed over the second and third annular protrusions 54 and 55, any irregular deformation thereof is less critical than that associated with the radially inner ridge immediately rearwardly adjacent the first annular protrusion 56.

Figure 5:
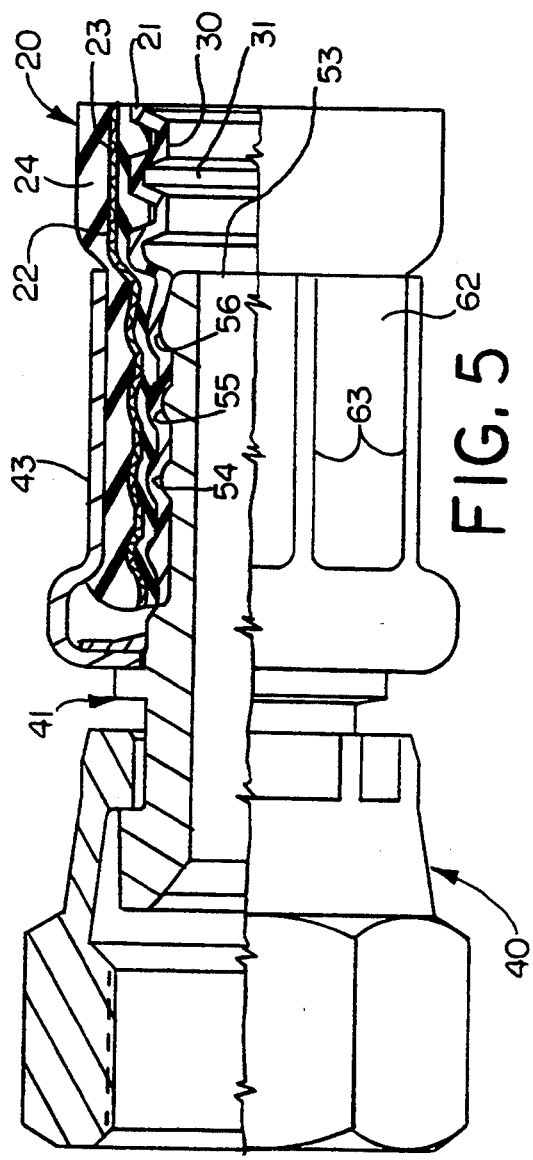
FIG. 5 is a view similar to FIG. 4 showing the fitting and hose assembly after crimping.

After the hose 20 has been telescoped over the insert portion 53 of the nipple 41, the sleeve 43 is radially inwardly crimped by conventional apparatus so as to radially inwardly compress the hose into sealing engagement with the insert portion and further to secure the hose between the insert portion and the crimped sleeve as shown in FIG. 5. As the hose is crimped, the annular protrusions 54–56 on the insert portion of the nipple become firmly anchored in the inner grooves 31 of the corrugated tube 21 while the inner ridges 30 of the corrugated tube become locked in the shallow recesses formed between the annular protrusions 54–56.

The formation of a fluid-tight seal between the hose 20 and fitting 40 not only is facilitated by the illustrated contour of the insert portion 53 of the nipple 41 and its relation to the inner corrugations of the hose, but also by the void 33 (FIG. 2) provided at the bottom of each radially outwardly opening groove 29 in the corrugated tube. During crimping, this void accommodates excess material thereby to minimize the formation of wrinkles in the inner corrugated tube thereby to prevent the formation of leakage paths between the hose and insert portion of the fitting.

Preferably, the sleeve 43 is crimped in such a manner that a plurality of axially extending flats 62 are formed and circumferentially spaced apart by axially extending, radially outwardly protruding flutes 63. The flutes 63 provide a shallow relief between relatively adjacent flats 62.

Figure 6:
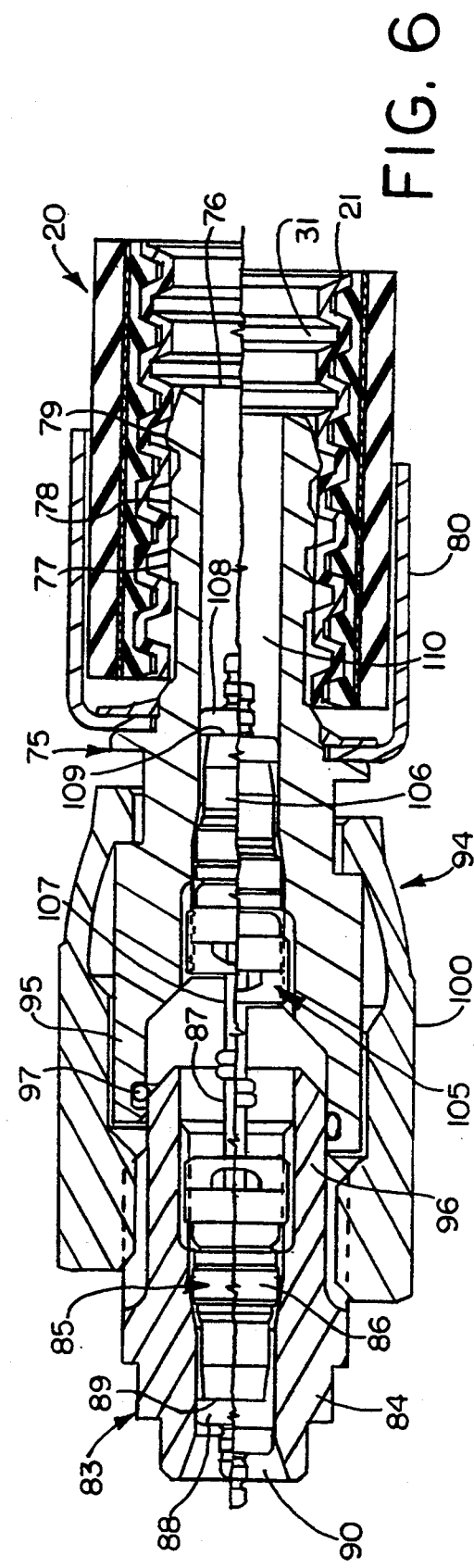
FIG. 6 is a cross-sectional view of a coupling assembly which is longitudinally split to show two different positions of the assembly.

Referring now to FIG. 6, another nipple insert configuration is illustrated at the right. The nipple, designated by reference numeral 75 in FIG. 6, has an insert portion 76 provided with annular protrusions 77–79 which are axially spaced apart at the same pitch as the inner grooves 31 of the inner corrugated tube 21 of the hose 20. In this embodiment, the first protrusion 79 preferably has the same configuration as described above in connection with the nipple 41 illustrated in FIG. 4. However, the second and third protrusions 77 and 78 have a forward ramp surface terminating at a flat crest which extends to a barb forming end face. Insertion of the nipple insert into the hose and crimping of the sleeve 80 are effected in the same manner described above in connection with the nipple and hose assembly illustrated in FIG. 4.

The fitting 75 is particularly adapted for coupling with the service fitting 83 of refrigeration equipment. The illustrated service fitting includes a body 84 having an industry standard contour, such fitting being conventionally provided at the high pressure or low pressure side of the refrigeration system's compressor for service of the refrigeration system.

The service fitting 83, as is typical, has an internal Schrader-type valve 85. The valve has an externally threaded core body 86 in which a plunger 87 is mounted for axial movement. Mounted to the rear end of the plunger 87 is a valve element 88 and a spring (not shown) within the core body normally urges the plunger forwardly (to the right in FIG. 6) to hold the valve element in sealing engagement with a valve seat 89 formed by the end face of the core body. In this manner, the internal passage 90 of the fitting is sealed against escape of fluid from left to right in FIG. 6. The valve spring also maintains the forward end of the plunger projected forwardly of the core body where it may be engaged in the below manner.

The nipple 75 is a component of a coupling 94 configured to connect with the service fitting 83 for transfer of refrigerant between the devices to which the fitting and coupling are attached. As shown, the nipple 75 has a sleeve portion 95 at its forward end that forms a cylindrical socket for telescopic receipt of the cylindrical forward end portion 96 of the service fitting. The socket wall is provided with an annular groove for retaining an O-ring 97 which seals between the nipple and service fitting.

The nipple 75 is secured to the service fitting by a swivel nut 100 which is journaled for rotation on the nipple. The nut 100 is internally threaded at its front end for screwing onto the externally threaded intermediate section of the service fitting body 84.

In accordance with the invention, the nipple 75 is internally threaded at an intermediate portion along the length of the through passage therein to receive a Schrader-type valve 105. Like the above-described Schrader-type valve 85, the Schrader-type valve 105 has an externally threaded core body 106 in which a plunger 107 is mounted for axial movement. Mounted to the rear end of the plunger 107 is a valve element 108 and a spring (not shown) within the core body normally urges the plunger forwardly (to the right in FIG. 6) to hold the valve element in sealing engagement with a valve seat 109 formed by the end face of the core body. In this manner, the internal passage 110 of the fitting is sealed against escape of fluid from right to left in FIG. 6. The valve spring also maintains the forward end of the plunger projected forwardly of the core body where it may be engaged in the below manner.

At the top in FIG. 6, the coupling 94 is shown part way attached to the service fitting 83, the illustrated position corresponding to the point at which the front ends of the plungers 87 and 107 in the Schrader-type valves 85 and 105 just come into contact. At this position, both valves will still be held closed by the valve springs therein thereby preventing the escape of refrigerant either from the refrigeration system to which the service fitting is connected or from the hose 20 to which the coupling is connected. Also, the O-ring seal 97 in the coupling will just be moving into sealing engagement with the service fitting.

Upon further movement together of the coupling 94 and service fitting 83 as is effected by tightening the swivel nut 100 on the service fitting, the Schrader-type valves 85 and 105 will be urged open by reason of the fact that the plungers thereof are butted together and hence remain stationary with respect to one another while the service fitting body 84 and nipple 75 move together.

As may occur, the pressures behind the Schrader-type valves 85 and 105 may initially be different by an amount sufficient to hold one of the valves closed while the other is opened. In order to open the closed valve to permit flow, pressure on the low side will need to be temporarily increased to effect opening of the closed valve. Once the valves are both open, refrigerant may flow in either direction through the connection between the service fitting and coupling.

To disconnect the coupling 94 from the service fitting 83, the swivel nut 100 may be unscrewed from the service fitting. As the nipple 75 is advanced away from the service fitting, the Schrader-type valves 85 and 105 will move to their closed positions to prevent the escape of refrigerant from the devices to which the fitting and nipple are connected.

As is known in the industry, Schrader-type valves are inexpensive even though reliable. Accordingly, the above described coupling is a low cost, but effective, alternative to prior art shut-off valves or quick connect-/disconnect couplings employed with refrigerant charging/recovering hoses.

Although the invention has been shown and described with respect to a preferred embodiment, it is obvious that equivalent alterations and modifications will occur to others skilled in the art upon the reading and understanding of this specification. The present invention includes all such equivalent alterations and modifications and is limited only by the scope of the following claims.

What is claimed is:

1. A flexible hose comprising
    an inner corrugated tube of polymeric material impervious to the fluid to be conveyed through the hose, said tube having alternating radially outer ridges and radially outwardly opening grooves axially staggered in relation to alternating radially inner ridges and radially inwardly opening grooves;
    an intermediate layer of elastomeric rubber material surrounding said inner corrugated tube and supported on said radially outer ridges;
    a braided layer of fiber reinforcement material on said intermediate layer; and
    an outer layer of elastomeric rubber material surrounding said braided layer of fiber reinforcement; and
    wherein said intermediate layer penetrates partway into said radially outwardly opening grooves with a void being left at a lower region of said radially outwardly opening grooves.

2. A flexible hose as set forth in claim 1, wherein said radially outer ridges of said inner corrugated tube are flat for controlling the degree of penetration of the intermediate layer into said radially outwardly opening grooves, 3. A flexible hose as set forth in claim 2, wherein said intermediate and outer layers are integrally joined together through interstices in said braided layer of fiber reinforcement by simultaneous curing thereof.

4. A flexible hose as set forth in claim 3, wherein said braided layer is formed by synthetic fibers braided around said intermediate layer of rubber material.

5. A flexible hose as set forth in claim 4, wherein said inner corrugated tube is made of a nylon material.

6. A flexible hose as set forth in claim 1, wherein said corrugations extend circumferentially of said tube.

7. An assembly comprising said flexible hose of claim 1 and a fitting secured to an end of said hose, said fitting including a nipple having an insert portion disposed in said hose and a tubular metal sleeve crimped around said hose coextensively with said insert portion of said nipple, said nipple including a plurality of circumferentially extending protrusions on the outer surface thereof that are axially spaced apart at the same pitch as said radially inwardly opening grooves of said hose and have an outer diameter greater than the inner diameter of said corrugated tube at said inner ridges thereof, and said protrusions being aligned with and extending into corresponding radially inwardly opening grooves of said hose.

8. An assembly as set forth in claim 7, wherein said insert portion has an axis, and the forwardmost one of said protrusions has at its forward end a frusto-conical ramp surface sloped at an angle of less than 30° to the axis of the insert portion.

9. An assembly as set forth in claim 8, wherein said protrusions define therebetween grooves that are shallower than the radially inwardly opening grooves of said inner corrugated tube of said hose and have flat bottoms, and said radially inner ridges of said inner corrugated tube of said hose have a width equal the width of the flat bottoms of said grooves between said protrusions.

10. An assembly as set forth in claim 9, wherein said protrusions protrude radially by an amount less than half the undeformed depth of said radially inwardly opening grooves of said inner corrugated tube of said hose.

11. An assembly comprising a flexible hose and fitting;
    said flexible hose including
    an inner corrugated tube of polymeric material impervious to the fluid to be conveyed through the hose, said tube having circumferentially extending corrugations including alternating radially outer ridges and radially outwardly opening grooves axially staggered in relation to alternating radially inner ridges and radially inwardly opening grooves;
    an intermediate layer of elastomeric rubber material surrounding said inner corrugated tube and supported on said radially outer ridges;
    a braided layer of fiber reinforcement material on said intermediate layer; and
    an outer layer of elastomeric rubber material surrounding said braided layer of fiber reinforcement; and
    said fitting including
    a nipple having an insert portion disposed in said hose, said insert portion having an axis, and
    a tubular metal sleeve crimped around said hose coextensively with said insert portion of said nipple with said nipple; and
    wherein said nipple includes a plurality of circumferentially extending protrusions on the outer surface thereof that are axially spaced apart at the same pitch as said radially inwardly opening grooves of said hose and have an outer diameter greater than the inner diameter of said corrugated tube at said inner ridges thereof, said protrusions being aligned with and extending into corresponding radially inwardly opening grooves of said hose, and the forwardmost one of said protrusions having at its forward end a frusto-conical ramp surface sloped at an angle of less than 30° to the axis of the insert portion.

12. An assembly as set forth in claim 11, wherein said protrusions define therebetween grooves that are shallower than the radially inwardly opening grooves of said inner corrugated tube of said hose and have flat bottoms, and said radially inner ridges of said inner corrugated tube of said hose have a width equal the width of the flat bottoms of said grooves between said protrusions.

13. An assembly as set forth in claim 11, wherein said protrusions protrude radially by an amount less than half the undeformed depth of said radially inwardly opening grooves of said inner corrugated tube of said hose.

14. A flexible hose as set forth in claim 11, wherein said intermediate and outer layers are integrally joined together through interstices in said braided layer of fiber reinforcement by simultaneous curing thereof.

15. A flexible hose as set forth in claim 14, wherein said braided layer is formed by synthetic fibers braided around said intermediate layer of elastomeric rubber material.

16. A flexible hose as set forth in claim 15, wherein said inner corrugated tube is made of a nylon material.

* * * * *